US 6,654,707 B2

(12) United States Patent
Wynn et al.

(10) Patent No.: US 6,654,707 B2
(45) Date of Patent: Nov. 25, 2003

(54) PERFORMING DIAGNOSTIC TESTS OF COMPUTER DEVICES WHILE OPERATING SYSTEM IS RUNNING

(75) Inventors: Allen Chester Wynn, Round Rock, TX (US); Charles James Lewis, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 136 days.

(21) Appl. No.: 10/035,108

(22) Filed: Dec. 28, 2001

(65) Prior Publication Data

US 2003/0125908 A1 Jul. 3, 2003

(51) Int. Cl.$^7$ .............................................. G06F 19/00
(52) U.S. Cl. ......................................... 702/186; 714/31
(58) Field of Search ................... 702/186, 117, 702/118; 714/25, 31

(56) References Cited

U.S. PATENT DOCUMENTS

| | | | | |
|---|---|---|---|---|
| 3,763,474 A | * | 10/1973 | Freeman et al. | 714/38 |
| 5,245,615 A | * | 9/1993 | Treu | 714/45 |
| 5,530,847 A | * | 6/1996 | Schieve et al. | 714/38 |
| 5,748,877 A | * | 5/1998 | Dollahite et al. | 714/36 |
| 5,754,853 A | * | 5/1998 | Pearce | 713/2 |
| 5,867,642 A | | 2/1999 | Vivio et al. | 395/182.06 |
| 6,279,125 B1 | * | 8/2001 | Klein | 714/38 |
| 6,338,150 B1 | * | 1/2002 | Johnson et al. | 714/39 |
| 6,449,735 B1 | * | 9/2002 | Edwards et al. | 714/25 |
| 6,539,499 B1 | * | 3/2003 | Stedman et al. | 714/40 |
| 6,591,358 B2 | * | 7/2003 | Jaffrey | 712/32 |
| 2001/0007140 A1 | * | 7/2001 | Landry et al. | 714/48 |

OTHER PUBLICATIONS

Internet Web page at www.tufftest.com, "#1—PC Diagnostics Company Home Page", date unknown.*
Internet Web page showing search at www.google.com and entitled "Reviews of Diagnsotic Software", date unknown.*
Compaq Computer Corp., Intel Corp., Microsoft Corp., Phoenix Technologies Ltd., Toshiba Corp.; *Advanced Configuration and Power Interface Specification*; Rev. 2.0; publication date unknown (website states, "Jul. 27, 2000"); visited Dec. 27, 2001; http://www.acpi.info/DOWNLOADS/ACPIspec20.pdf.
Compaq Computer Corp., Intel Corp., Microsoft Corp., Phoenix Technologies Ltd., Toshiba Corp.; *Advanced Configuration and Power Interface Specification Revision 2.0 Errata*; Errata Document Rev. 1.5; publication date unknown (website states, "Apr. 13, 2001"); visited Dec. 27, 2001; http://www.acpi.info/DOWNLOADS/ACPIerrata15.pdf.

* cited by examiner

Primary Examiner—Patrick Assouad
(74) Attorney, Agent, or Firm—Baker Botts L.L.P.

(57) ABSTRACT

A system and method of performing diagnostic tests of computer devices, including but not limited to memory, while the operating system is running, is presented. One embodiment comprises making a device unavailable for use by a running operating system; making a processor unavailable for use by the running operating system; and running a diagnostic test of the device, the processor executing the diagnostic test to determine whether the device is functioning acceptably, while the processor and the device are unavailable for use by the running operating system.

30 Claims, 4 Drawing Sheets

PERFORMING DIAGNOSTIC TESTS OF COMPUTER DEVICES WHILE OPERATING SYSTEM IS RUNNING

BACKGROUND OF THE INVENTION

1. Field of the Invention

This invention relates to the field of information handling and/or computer system design, operations, and maintenance. More specifically, this invention relates to a process for performing diagnostic tests on device operably connected to an information handling and/or computer system while the system's operating system is running.

2. Description of the Related Art

Information handling systems in general have attained widespread use in business as well as personal computing environments. An information handling system, as referred to herein, may be defined as an instrumentality or aggregate of instrumentalities primarily designed to compute, classify, process, transmit, receive, retrieve, originate, switch, store, display, manifest, detect, record, reproduce, handle or utilize any form of information, intelligence or data for business, scientific, control or other purposes. The information handling system may be configured for a specific user application or requirement such as financial transaction processing, airline reservations, enterprise data storage and/or global communications. In general, an information handling system may include a variety of hardware and/or software components that may be configured to provide information and/or consume information. An information handling system may include one or more computer systems, data storage systems, and/or networking systems.

A computer system, which is one common type of information handling system, may be designed to give independent computing power to one or a plurality of users. Computer systems may be found in many forms including, for example, mainframes, minicomputers, workstations, servers, clients, personal computers, Internet terminals, notebooks, personal digital assistants, and embedded systems.

A computer system may be available as a desktop, floor-standing unit, or as a portable unit. The computer system typically includes a microcomputer unit having a processor, volatile and/or non-volatile memory, a display monitor, a keyboard, one or more floppy diskette drives, a hard disc storage device, an optional optical drive, e.g., DVD, CD-R, CD-RW, Combination DVD/CD-RW or CD-ROM, and an optional printer. A computer system also includes a commercially available operating system ("OS"), such as Microsoft Windows XP™ or Linux.

A computer system may also include one or a plurality of peripheral devices such as input/output ("I/O") devices coupled to the system processor to perform specialized functions. Examples of I/O devices include keyboard interfaces with keyboard controllers, floppy diskette drive controllers, modems, sound and video devices, specialized communication devices, and even other computer systems communicating with each other via a network. These I/O devices are typically plugged into connectors of computer system I/O interfaces such as serial interfaces and parallel interfaces, for example. Generally, these computer systems use a system board or motherboard to electrically interconnect these devices.

As used herein, the terms "input/output device" and "I/O device" include but are not limited to modems, sound and video devices, controllers, specialized communication devices, mass storage devices such as hard discs, compact disc ("CD") drives of many varieties, magneto-optical drives, other data storage devices, and remote terminals and processors that exchange information and data with a computer system, including exchanges over conductive means, e.g., telephone circuits, intranets, local area networks, and the Internet.

Computer systems also typically include basic input/output system ("BIOS") programs to ease programmer/user interaction with the computer system devices. More specifically, BIOS provides a software interface between the system hardware and the operating system/application program. The operating system ("OS") and application program typically access BIOS rather than directly manipulating I/O ports, registers, and control words of the specific system hardware. Well known device drivers and interrupt handlers access BIOS to, for example, facilitate I/O data transfer between peripheral devices and the OS, application program, and data storage elements. BIOS is accessed through an interface of software interrupts and contains a plurality of entry points corresponding respectively to the different interrupts. In operation, BIOS is typically loaded from a BIOS ROM or BIOS EPROM, where it is nonvolatily stored, to main memory from which it is executed. This practice is referred to as "shadowing" or "shadow RAM" and increases the speed at which BIOS executes.

Although the processor provides the "kernel" of the computer system, I/O communication between an I/O device and the processor forms a basic feature of computer systems. Many I/O devices include specialized hardware working in conjunction with OS specific device drivers and BIOS routines to perform functions such as information transfer between the processor and external devices, such as modems and printers, coupled to I/O devices.

Computer systems typically include peripheral memory storage devices such as optical disc drives with removable storage media. The removable storage media is typically used to store and/or load software, data, and documentation. Examples of optical disc drives with removable storage media include audio CD, CD-ROM, CD-R, CD-RW, DVD and combination DVD/CD-RW. To load the selected operating system on to the hard disc for the first time, the PC manufacturer typically uses a boot device to initially boot up the PC. A boot device may typically include a floppy disc or a CD-ROM.

Full memory testing on information handling systems such as high-end servers featuring non-uniform memory access (NUMA) architecture can take a long period of time when the server is booted because of the large amount of random access memory (RAM) contained in the system and the latency associated with remote memory access. Additionally, these servers are often used for mission-critical tasks that require that they be kept operating without interruption. They are therefore generally not rebooted during time periods extending up to several years. When such a system is rebooted after a long period, many users find that various components have failed.

Once a system is taken out of operations or is booted to conduct tests, memory tests can take a long period of time for a number of reasons. First, as already mentioned, the large amount of memory (up to 64 gigabytes (GB)) in some systems can simply take a long time to test. Second, the types of testing required to test a memory thoroughly can take a long time to execute. For example, often used is a walking one-bit, walking zero-bit test, which includes changing a single bit within an address line (generally 512 bits) to determine if a single bit affects any other bits within the data path. As another example, a byte addressing test is used to determine that addressing of a memory location is unique across address lines. Finally, the additional latency of testing remote memory from a system boot strap processor (BSP) further lengthens the testing time.

Generally, memory testing in these high-end servers is run when the system is booted. As noted above, these boots are generally infrequent, and the boot testing keeps the system out of service for a long period of time. One alternative used is to test the memory with diagnostic software. A disadvantage of this alternative is that it is generally performed during infrequent downtime, so the tests are widely separated in time. Another disadvantage is that it is difficult to perform low-level diagnostic testing while the operating system is running the system.

What is needed is a system and method of performing testing of computer system components including memory components, including low-level testing, in high-end servers, including NUMA servers, while the OS is running, to avoid the problems associated with infrequent testing to keep systems in operation, and with keeping systems out of service during long testing periods.

SUMMARY OF THE INVENTION

A system and method are presented for performing testing of computer system components including memory components, including low-level testing, in computer systems while the operating system is running, including but not limited to high-end NUMA servers.

A method is presented, comprising making a device unavailable for use by a running operating system; making a processor unavailable for use by the running operating system; and running a diagnostic test of the device, the processor executing the diagnostic test to determine whether the device is functioning acceptably, while the processor and the device are unavailable for use by the running operating system.

A system is presented, comprising at least two processors; a memory operably coupled to the processor; an operating system operably installed in the memory; a software program operably installed in the memory for making a device unavailable to the operating system while the operating system is running; a software program operably installed in the memory for making a processor unavailable to the operating system while the operating system is running; and a software program operably installed in the memory for running a diagnostic test of the device, the processor executing the diagnostic test while the device and the processor are unavailable for use by the running operating system to determine whether the device is functioning acceptably.

An apparatus is presented, comprising means for making a device unavailable for use by a running operating system; means for making a processor unavailable for use by the running operating system; and means for running a diagnostic test of the device, the processor executing the diagnostic test to determine whether the device is functioning acceptably, while the processor and the device are unavailable for use by the running operating system.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
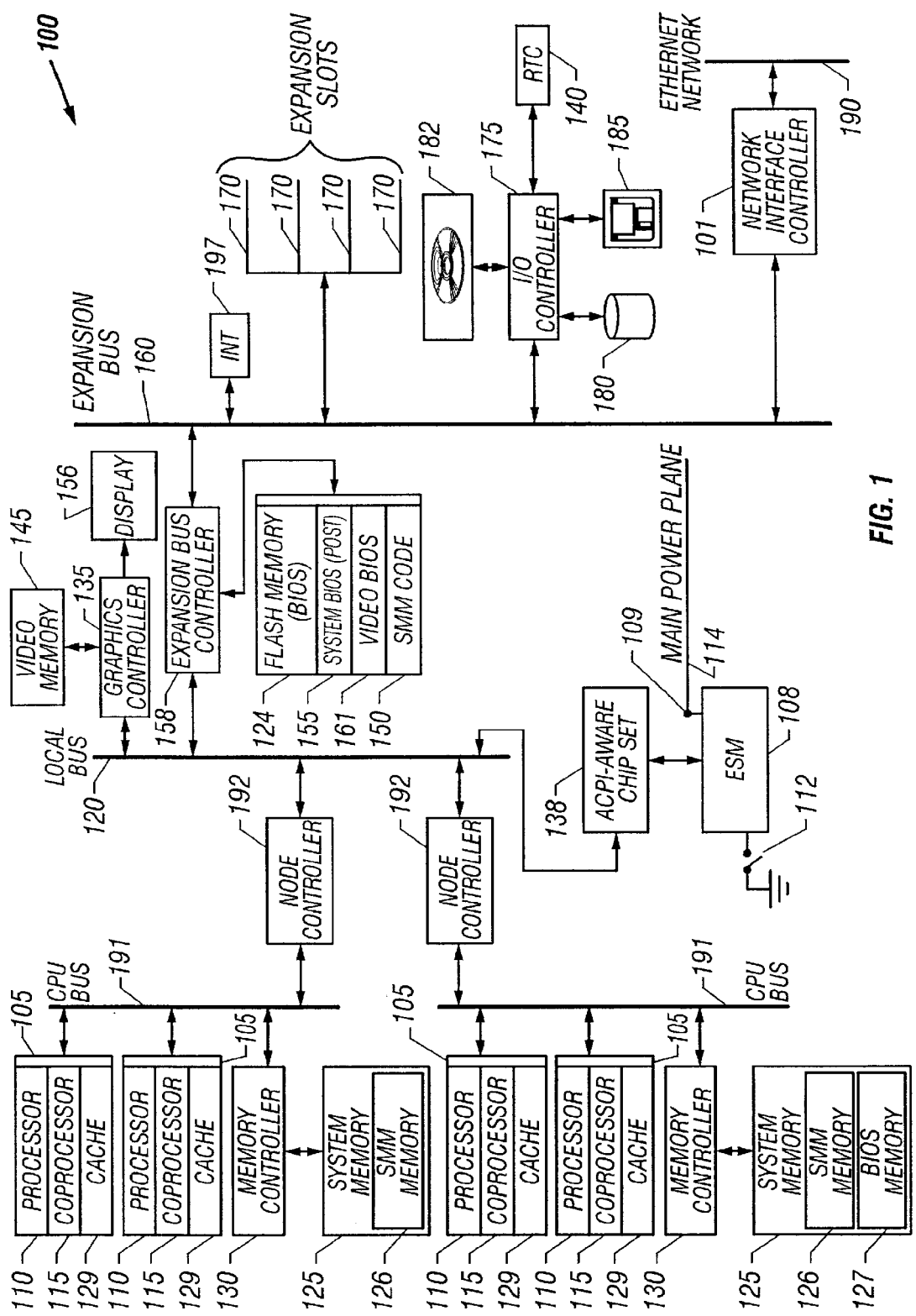
FIG. 1 is a block diagram of an embodiment of the invention.

The following sets forth a detailed description of a mode for carrying out the invention. The description is intended to be illustrative of the invention and should not be taken to be limiting.

An embodiment of the invention is compatible with and makes use of the *Advanced Configuration and Power Interface Specification, Rev.* 2.0, Jul. 27, 2000, by Compaq Computer Corporation, Intel Corporation, Microsoft Corporation, Phoenix Technologies, Ltd., and Toshiba Corporation (herein, "ACPI 2.0"), which is incorporated herein by reference in its entirety.

> The interfaces and OSPM [Operating System-directed configuration and Power Management] concepts defined within this specification are suitable to all classes of computers including (but not limited to) desktop, mobile, workstation, and server machines. From a power management perspective, OSPM/ACPI promotes the concept that systems should conserve energy by transitioning unused devices into lower power states including placing the entire system in a low-power state (sleeping state) when possible. * * * As defined in this document [ACPI 2.0], ACPI is a method for describing hardware interfaces in terms abstract enough to allow flexible and innovative hardware implementations and concrete enough to allow shrink-wrap OS [operating system] code to use such hardware interfaces.

See ACPI 2.0, page 1, section 1, "Introduction," and page 13, section 2.1, definition of "Advanced Configuration and Power Interface (ACPI)."

In ACPI 2.0, an "object" is a logical item that represents one or more physical components (or "devices" as used herein). ACPI 2.0 defines "device" as a hardware component that is outside the core chip set of a platform; this definition includes buses. ACPI 2.0 supports modules that combine multiple objects into one logical object. ACPI 2.0 also defines memory and processors such that they may be "ejected" and "inserted," terms that are discussed herein. These features of ACPI 2.0 were added to support modular and NUMA systems. The present invention uses these features to implement the capability to perform a full diagnostic test of various components while the OS of a computer system is performing normal operations.

One embodiment uses a user-level application program, running under an OS, that can be scheduled to run diagnostic tests by a user such as a system administrator at predetermined times falling in non-peak periods, thereby reducing the impact of low-level device testing. As used herein, a user-level application program is one of a plurality of software programs that perform a variety of function, e.g., word processing, document management, and electronic mail ("e-mail") communications. Here the user-level application program performs functions related to diagnostic testing. For example, if a particular system experiences a non-peak period on Saturday evenings, a system administrator can schedule a user-level application program to run the desired low-level tests on Saturdays at 8 p.m. In an aspect of this embodiment, the device or devices being tested are returned to availability to the OS if the computer system's workload increases to some pre-selected level that requires the resources being tested. In an aspect of this embodiment, the low-level testing is performed by a BIOS System Abstraction Layer (SAL) routine. In an aspect of this embodiment, the user-level application program decides which device or devices to test based on a scheduling method, e.g., a round-robin schedule.

Referring to FIG. 1, an embodiment of the invention, an ACPI-compatible information handling system 100, wherein system 100 is a server, is shown.

Information handling system 100 generally includes two or more microprocessors 105, e.g., a microprocessor comprising an Intel 82870 chip set. Each microprocessor 105 generally includes a processor 110 for handling integer operations and a co-processor 115 for handling floating point operations. As used herein, the term "processor" includes but is not limited to microprocessors including microprocessor 105, processor 110, and co-processor 115. In servers, cache 129 is generally an integral component of each processor 105 as shown.

In the information handling system 100 depicted in FIG. 1, at least one microprocessor 105, and in some systems more than one microprocessor 105, is operably coupled to each CPU bus 191. In the information handling system depicted, two microprocessors 105 are shown operably coupled to each of two CPU buses 191 shown. Further, generally, a system memory 125 is operably coupled to a memory controller 130 that is in turn operably coupled to each CPU bus 191. Generally, one node controller 192 operably connects each CPU bus 191 to a local bus 120, and each node controller 192 is generally characterized as part of a system controller such as a Pico Power Vesuvious chip set or an Intel™ Mobile Triton™ chip set. Node controller 192 can be programmed in a well-known manner to intercept a particular target address or address range, and, upon intercepting a target address or address range, node controller 192 asserts an intercept signal indicating that processor 105 attempted to access the target address or address range.

Graphics controller 135 is operably coupled to local bus 120. Graphics controller 135 is also operably coupled to a video memory 145, which stores information to be displayed on display 156.

Expansion bus controller (also known as a bus interface controller) 158 operably couples local bus 120 to an expansion bus 160. In the information handling system depicted in FIG. 1, expansion bus 160 is an Industry Standard Architecture ("ISA") bus, although other buses could be used, e.g., a Peripheral Component Interconnect ("PCI") bus. Expansion bus slots 170 (of which four are shown in FIG. 1) are operably coupled to expansion bus 160 to receive expansion cards, e.g., modems, fax cards, communication cards, and other input/output ("I/O") devices. Interrupt generator 197 is also operably coupled to expansion bus 160 and issues an interrupt service request over a predetermined interrupt request line after receiving a request to issue an interrupt instruction from processor 105.

An information handling system such as the information handling system depicted in FIG. 1 may also include an interface to a computer network such as a local area network ("LAN"), a wide area network ("WAN"), the Internet, an Internet, a wireless broadband system, or a like system. In the information handling system 100 depicted, network interface controller 101 forms a network interface for communicating with other network systems (not shown) connected to Ethernet 190. The networking components comprised by information handling system 100 include hardware components, such as network interface controller 101 and Ethernet 190, and software components (not shown).

The information handling system 100 depicted in FIG. 1 includes an I/O controller 175 (also called a "super I/O controller") that is operably coupled to an expansion bus 160. I/O controller 175 is generally operably coupled to an integrated electronics drive ("IDE") hard drive 180, an optical disc drive 182, and a floppy drive 185.

The information handling system 100 depicted in FIG. 1 includes embedded server management (ESM) processor (herein, "ESM processor" or "ESM") 108, which in turn includes a power output 109 operably coupled to the main power plane 114 which supplies power to processors 105. ESM processor 108 is also operably coupled to a main power switch 112, which the user uses to turn information handling system on and off.

The information handling system 100 depicted in FIG. 1 includes an ACPI-aware chip set 138 that is operably coupled to processor 105 via local bus 120, node controllers 192, and CPU buses 191, and to ESM processor 108, such that ACPI-aware chip set 138 can receive power control commands from processor 105. ACPI-aware chip set 138 is connected to a plurality of individual power planes (not shown) that supply power to respective devices in information handling system 100 such as hard drive 180 and floppy drive 185. A real time clock ("RTC") 140 is operably coupled to I/O controller 175 and ACPI-aware chip set 138 such that time events or alarms can be transmitted to ACPI-aware chip set 138. RTC 140 can be programmed to generate an alarm signal at a predetermined time.

In information handling system 100, a flash memory or some other type of non-volatile memory is used to store a BIOS program (not shown) in BIOS memory area 124. A flash memory or some other type of non-volatile memory is also generally used for the following purposes: system BIOS code (generally including a power-on self-test ("POST") software module) is stored in system BIOS memory area 155; video BIOS software for booting up video peripherals is stored in video BIOS memory area 160; and system management memory ("SMM") code is stored in SMM memory area 150. Memory areas 124, 155, 161, and 150 are generally operably coupled to expansion bus controller 158.

When information handling system 100 is turned on or powered up, information handling system 100 enters a start-up phase, also referred to as a boot-up phase, during which the information handling system hardware is detected and the OS is loaded. During the initial boot stage, the information handling system BIOS software stored in BIOS memory area 124 is copied into each system memory 125 so that it can be executed more quickly. This technique is referred to as "shadowing" or "shadow RAM" as discussed above. At this time, SMM code stored in SMM memory area 150 is also copied into the SMM memory area 126 of main memory 125. Processor 105 executes SMM code 150 after processor 105 receives a system management interrupt ("SMI") which causes the microprocessor to enter SMM. System BIOS code stored in system BIOS memory area 155 and video BIOS code stored in video BIOS memory area are also copied into each system memory area 125. It will be recognized by those of ordinary skill in the art that other memory mapping schemes may be used. For example, SMM code 150 may be stored in fast SRAM memory (not shown) coupled to the local/processor bus 120.

One of the two system memory areas 125 depicted is shown comprising a BIOS memory area 127. Generally, during the boot-up procedure, the nodes, each comprising a node controller 192, a CPU bus 191 operably coupled to the node controller 192, processors 105 operably coupled to the CPU bus 191, memory controllers 130 operably coupled to the CPU bus 191, and system memory 125 operably coupled to memory controller 130, arbitrate to make one of the nodes a master node. After the master node is determined, BIOS is retained in BIOS memory area 127 within system memory 125, while in all other nodes, BIOS is deleted. This retention and deletion is depicted in FIG. 1 by a depiction in BIOS memory area 127 within the system memory 125 in which BIOS is retained, but such a BIOS memory area 127 is not depicted in any system memory in which BIOS is not retained. Within each node, the processors 105 arbitrate for one of them to become the bootstrap processor ("BSP"), while all the other processors in a given node become auxiliary processors ("APs").

The information handling system 100 serves as a controller for resolving proprietary and standard event and message structures into a common format for use by the computer network for many management purposes. The information handling system 100 is connected with a plurality of computer systems in the network for receiving messages from the computer systems, analyzing the messages and determine an effective utilization of the messages as directed by a user or network administrator. The information handling system 100 receives messages in different message formats, organizes the messages, and converts the messages into a common format that assists a user, system administrator, or network administrator in utilizing the information contained in the messages. The information handling system 100 supports the conversion of messages into the common format to facilitate particular network applications.

In the exemplary information handling system 100 of FIG. 1, an OS (not shown) that is compliant with ACPI 2.0 is operably installed in each system memory 125.

To make memory such as each system memory 125 available in small amounts for testing, allowing fine-granular memory testing, memory for the exemplar information handling system 100 is represented in one embodiment by multiple ACPI memory device objects.

It will be appreciated that a person skilled in the art will recognize that an information handling system may be implemented in a variety of ways of which information handling system 100 of FIG. 1 is merely an example and is not intended to be limiting.

Figure 2:
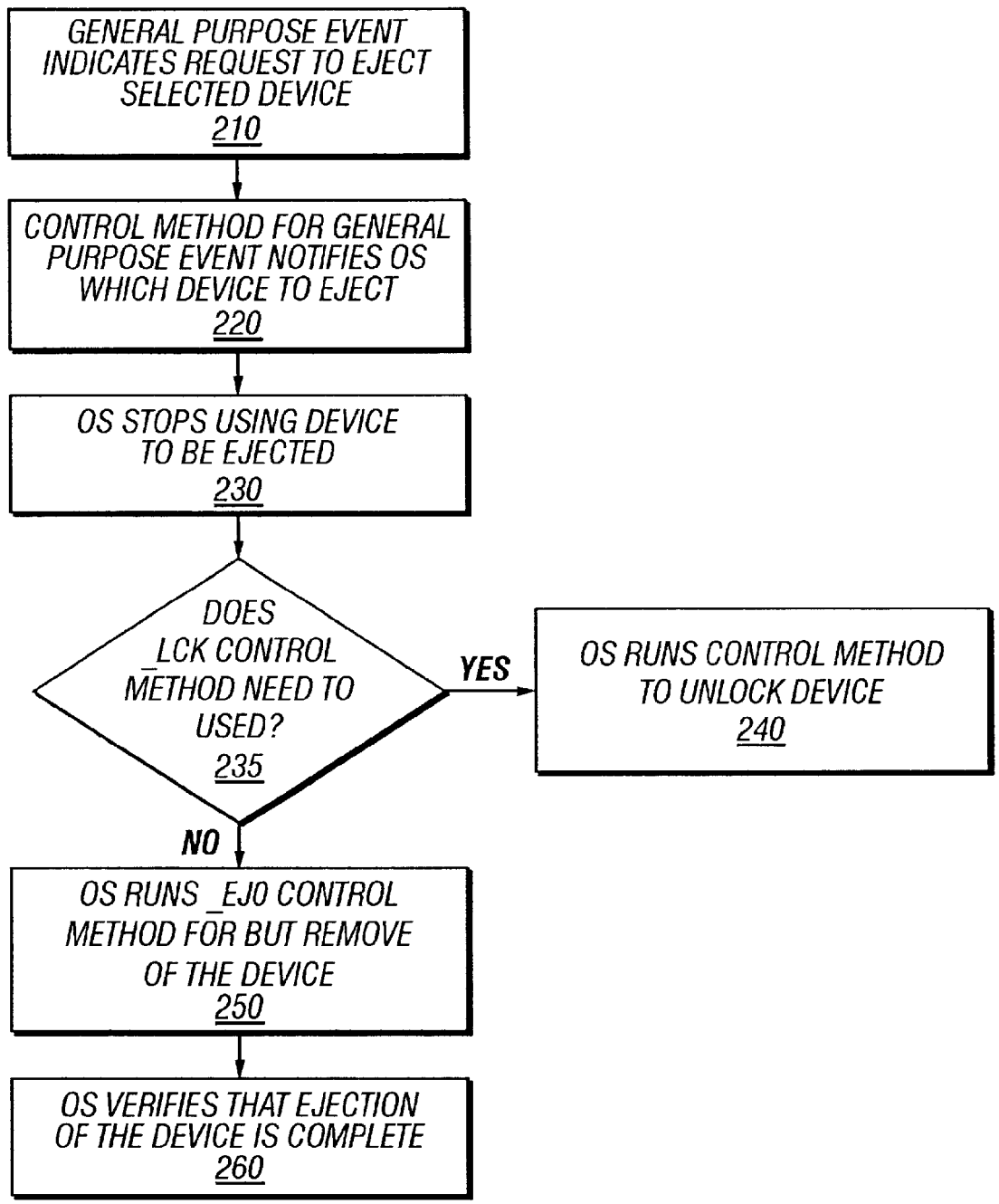
FIG. 2 is a flow chart depicting the steps of ejection of a device in an embodiment.

FIG. 2 is a flow chart depicting the steps of an ejection of a device in an embodiment.

A general-purpose event indicates a request to eject a selected device (step 210). A general-purpose event is simply the communication of a request to an ACPI 2.0-compliant OS to eject a selected device.

When an ACPI 2.0-compliant OS receives a request to eject a device, the OS stops using that device. The present invention uses that feature of ACPI 2.0-compliant systems to eject memory and one or more processors to perform low-level tests, e.g., full-memory tests, while the OS is still running on one or more processors that are not ejected.

As used herein, the terms "eject," "ejection" and like terms do not refer to physical removal of a device. The ejection feature does not physically remove the ejected device, or permit it to be physically removed from the system. Rather, ejection as used herein merely makes the ejected device unavailable to the OS. Ejection of a device allows computer systems such as high-end servers running mission-critical operations simultaneously with the performance of low-level tests of ejected devices. Further, ejection of a device does not disable the ejected hardware. The hardware remains configured, but the OS no longer uses the device because it "thinks" that the device is unavailable. The ejected device to be tested, however, remains available to the ejected processor performing the test. The ejected processor performing the test executes the test at the BIOS level.

Similarly, as used herein, the terms "insert," "insertion" and like terms do not refer to physical replacement of an ejected device. The insertion feature does not physically insert a device, or permit a device to be physically added to an information handling system. Rather insertion as used herein merely makes the devise available to the OS.

The use of "eject," "ejection," "insert," "insertion," and like terms herein is consistent with the usage of those terms in ACPI 2.0.

The discussion of embodiments of the invention generally refers to "device," but a general-purpose event can indicate requests to eject two or more selected devices. ACPI 2.0 defines a "module object" that is used to group two or more objects into one logical object. The module object may contain an _Ejx object, indicating to the OS that the entire module is to be ejected as an aggregate. Thus, a module object enables the treatment of a group of objects as one object.

In one embodiment, a user-level application program communicates with a service processor that generates a general-purpose event indicating a request to eject a selected device. A "service processor" is a processor that is not being used for a server's normal, operational tasks. A service processor is also referred to as being "out of band." In this embodiment, the service processor is ESM processor 108.

In one embodiment, a user-level application program communicates with a service processor that generates a general-purpose event indicating a request to eject a selected device. A "service processor" is a processor that is not being used for a server's normal, operational tasks. A service processor is also referred to as being "out of band." In this embodiment, the service processor is an embedded server management (ESM) processor (herein, "ESM processor" or "ESM").

In one embodiment, the invention makes efficient use of the capabilities of an ACPI 2.0 compliant OS by using the information contained in an affinity table to select a testing processor (herein, a "testing processor" is a service processor that has been selected for use to run diagnostic testing) that is physically close to the device on which the low-level test is to be performed. This selection of a processor physically close to the device to be tested reduces remote accesses, increasing the speed of the testing when compared to tests run by processors not as close to the tested device and thereby reducing the impact of the testing on the computer system as a whole. While this increased efficiency is of particular benefit to NUMA systems, it can also be realized in non-NUMA systems as well.

The testing processor is also ejected according to the procedure depicted in FIG. 2.

In one embodiment, a user-level application program running under the OS is used to communicate with a service processor and/or to select a testing processor. It will be appreciated that one skilled in the art will recognize that other means besides a user-level application program can be used to communicate with a service processor or to select a testing processor object, including but not limited to a user interface.

The control method for the general-purpose event notifies the OS which device to eject (step 220).

A "control method" is a definition of how the OS can perform a simple hardware task. For example, the OS invokes control methods to read the temperature of a thermal zone. Control methods are written in an encoded language called ACPI Machine Language (AML) that can be interpreted and executed by the ACPI-compatible OS. An ACPI-compatible system must provide a minimal set of control methods in the ACPI table. The OS provides a set of well-defined control methods that ACPI table developers can reference in their control methods. Original Equipment Manufacturers ("OEMs") can support different revisions of chip sets with one BIOS by either including control methods in the BIOS that test configurations and respond as needed or including a different set of control methods for each chip set revision.

The OS stops using the device by, for example, unloading device drivers, moving virtual memory to other physical locations, re-mapping memory, and stopping the dispatching of jobs to the device (step 230).

If the device to be ejected has the _LCK (lock) control method, the OSPM runs the control method to unlock the device (steps 235 and 240).

The _LCK control method is required only for a device that supports a software-controlled locking mechanism. When an OS invokes the _LCK control method, the associated device is to be locked or unlocked based on the value of the argument that is passed. In ACPI 2.0, devices use either a _LCK control method or an EJx control method for a device.

The _EJx (Eject) control methods are supplied for devices that support a software-controlled "VCR-style" ejection mechanism or that require an action be performed such as isolation of power/data lines before the device can be removed from the system. To support warm and hot removal (where warm means that the system is in a sleep state and hot means the system is in "S0", the system working state), an _EJx control method is listed for each sleep state from which the device supports removal, where x is the sleep state supported. Control method _EJ0 indicates that the device supports hot removal, while _EJ1–_EJ4 indicate that the device supports warm removal. A device may have multiple _EJx control methods.

The OS runs the _EJ0 control method for hot removal of the device so the system does not need to be put in a sleep state for ejection of the selected device (step 250). The _EJ0 control method modifies the device status returned by the device's _STA control method to indicate that the device is not present, and then returns when the ejection is complete.

The _STA object returns the status of a device. It is normally implemented as a method so the status can be programmatically determined, evaluating to a 32-bit binary value as defined in ACPI 2.0, section 6.2.6.

For the power resource, the _STA object returns the current "on" or "off" status for the power resource.

The OSPM verifies that ejection of the selected device is complete (step 260). The OSPM evaluates the _STA method (because the processor and memory will be _HID devices, not _ADR devices).

The _HID object is used to supply OSPM with a device's Plug and Play hardware ID. A _HID object must be used to describe any device that will be enumerated by OSPM. OSPM enumerates a device when no bus enumerator can detect the device ID. The _ADR object is used to describe devices enumerated by bus enumerators other than OSPM.

Figure 3:
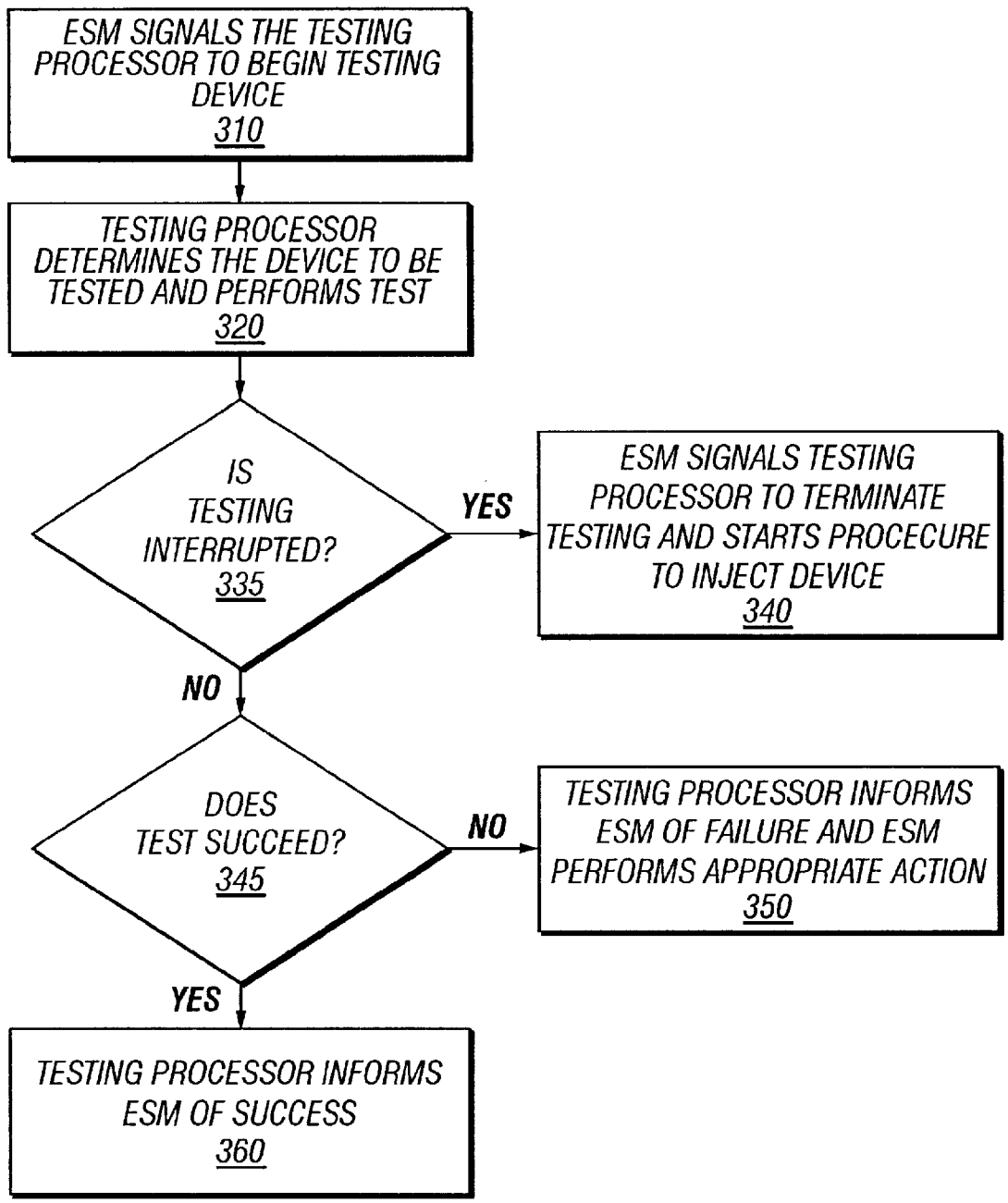
FIG. 3 is a flow chart depicting the steps of performing a diagnostic test of an ejected device in an embodiment.

FIG. 3 is a flow chart depicting the steps of performing a diagnostic test of an ejected device in an embodiment.

ESM signals the testing processor to begin testing the ejected device to be tested (step 310). Methods to signal the processor include "platform management interrupt" (PMI), "system management interrupt" (SMI), "initialize" (INIT), "reset" (RESET), and "machine check abort" (MCA), but other mechanisms would work as well.

The request to begin testing causes the processor to begin executing BIOS, Processor Abstraction Layer (PAL) or SAL code.

The testing processor determines the device to be tested and performs the test (step 320). Because the processor and the device being tested (herein, "tested device") are unknown to the OS during the testing, the processor can be viewed as a "service processor" rather than as a normal BSP or auxiliary processor ("AP") while those tests are being performed.

In an aspect of this embodiment, if testing of a device is interrupted for any reason, e.g., a workload increase requiring the device being tested, the user-level application program (or in other embodiments, other means) notifies ESM, and ESM signals the ejected testing processor that the testing is to be terminated (steps 335 and 340). In this aspect, ESM then initiates the ACPI 2.0 procedures for insertion of the testing processor and the device that was to have been tested back into the computer system (see FIG. 4 and accompanying discussion herein).

If the test fails by failing to demonstrate acceptable device functionality, the testing processor informs ESM of the failure (steps 345 and 350), and ESM performs an appropriate action (which action is beyond the scope of the present invention).

If the test succeeds by demonstrating acceptable device functionality, the testing processor informs ESM of the success (steps 345 and 360). In an aspect of this embodiment, if the tested device is a memory device, the contents of the memory are initialized (e.g., set to all zeroes or all of some other value).

Figure 4:
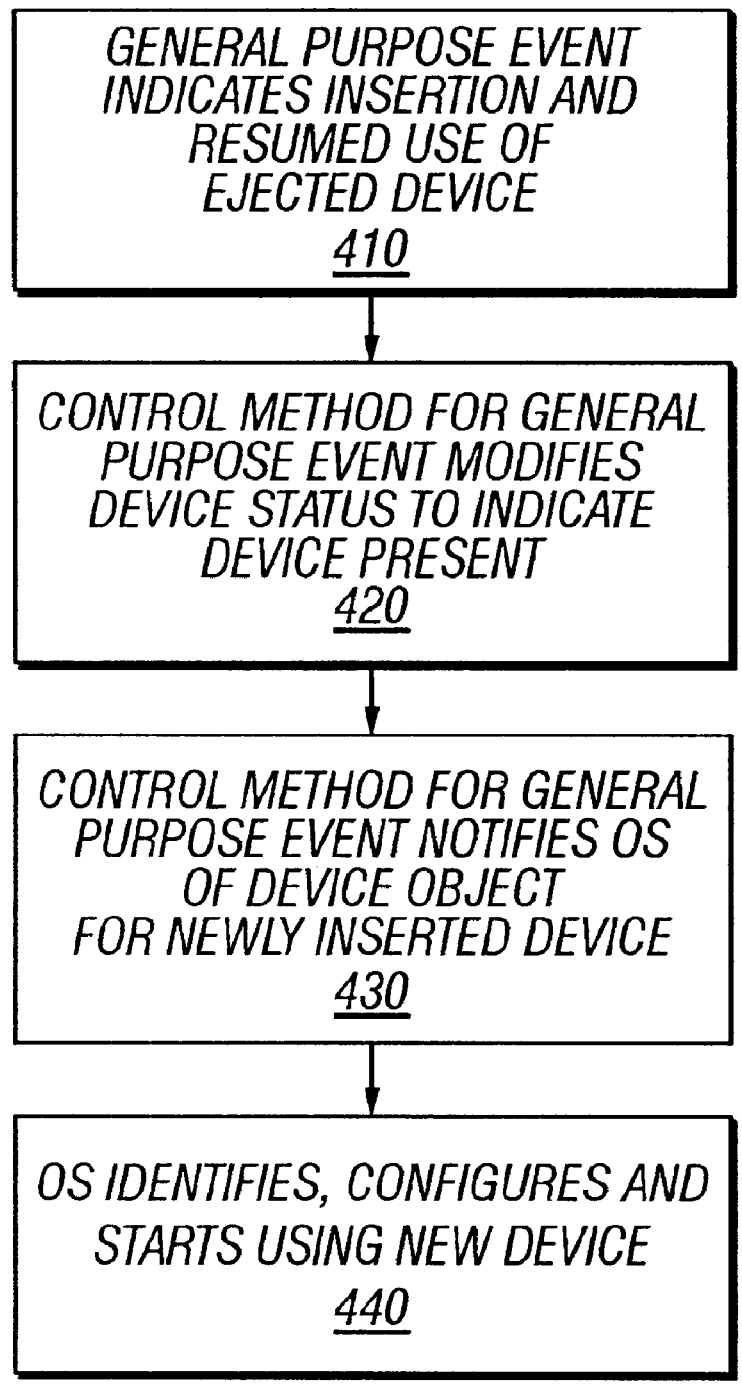
FIG. 4 is a flow chart depicting the steps of insertion of an ejected device in an embodiment.

ESM initiates the ACPI 2.0 steps to insert the testing processor and the tested device (see FIG. 4 and accompanying discussion herein).

FIG. 4 is a flow chart depicting the steps of an insertion of an ejected device in an embodiment. The ejected device to be inserted by the depicted procedure can be a testing processor, a tested device, or a device which was being tested but the test was interrupted.

In one aspect of the embodiment, if the device to be inserted is a testing processor, when converting the testing processor from a service processor back to an AP, the insertion procedure can reuse existing BIOS code for hot-plugging a processor. This re-use includes a RESET from ESM, and the testing processor determines that it is to be hot-plugged into a system and executes code that a normal processor executes (e.g., no BSP selection, end in a rendezvous state).

A general-purpose event indicates insertion and resumed use of an ejected device (step 410).

The control method for the general-purpose event modifies the device status returned by the _STA object to indicate that the device is now present, thereby inserting the device (step 420).

The control method for the general-purpose event notifies the OSPM of the device object for the newly-inserted device (herein the "new device") (step 430).

The OSPM identifies, configures, and starts using the new device (step 440).

In an aspect of this embodiment, after insertion of the new device, the user-level application program collects the test results, and either selects another device to be tested and starts the procedure depicted in FIG. 2 for that device, or stops testing devices, depending on the requirements of its testing schedule.

In another embodiment, rather than all of the memory of a computer system being available for ejection, testing, and insertion, the present invention tests spare rows of memory, wherein an area of memory is periodically swapped out, ejected, thoroughly tested, inserted, and swapped back in again for use by a computer system. This embodiment is suitable for use in non-NUMA systems. Such row swapping permits the OS to view memory as contiguous, while leaving a row available for testing, where the hardware permits such swapping.

OTHER EMBODIMENTS

One skilled in the art will recognize that the foregoing components (e.g., steps), devices, and objects in FIGS. 1, 2, 3, and 4 the discussion accompanying them are used as examples for the sake of conceptual clarity and that various configuration modifications are common. Consequently, as used herein the specific examples set forth in FIGS. 1, 2, 3, and 4 and the accompanying discussion are intended to be representative of their more general classes. In general, use of any specific example herein is also intended to be representative of its class, and the non-inclusion of such specific components (e.g., steps), devices, and objects herein should not be taken as indicating that limitation is desired.

While particular embodiments of the present invention have been shown and described, it will be obvious to those skilled in the art that, based upon the teaching herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

Other embodiments are within the following claims.

What is claimed is:

1. A method comprising:
   making a device unavailable for use by a running operating system;
   making a processor unavailable for use by the running operating system; and
   running a diagnostic test of the device, the processor executing the diagnostic test to determine whether the device is functioning acceptably, while the processor and the device are unavailable for use by the running operating system.
2. The method of claim 1, wherein
   the making the device unavailable includes ejecting the device; and
   the making the device available includes inserting the device.
3. The method of claim 1, wherein
   the making the processor unavailable includes ejecting the processor; and
   the making the processor available includes inserting the processor.
4. The method of claim 1, wherein
   the device is a logical object including a t least one hardware component.
5. The method of claim 1, wherein
   the processor is a logical object including at least one hardware component.
6. The method of claim 1, further comprising:
   making the device available for use by the running operating system if the diagnostic test demonstrates acceptable device functionality.
7. The method of claim 6, wherein
   the running operating system receives requests for the making the device and the processor unavailable for use by the running operating system.
8. The method of claim 1, wherein
   a user-level application program performs
   the making the device unavailable;
   the making the processor unavailable;
   the running;
   the making the device available; and
   the making the processor available.
9. The method of claim 1, wherein
   the running is interrupted when a workload increase of a predetermined magnitude occurs; and
   the making the device available follows the interruption of the running.
10. The method of claim 1, wherein
    the device is a memory component.
11. An information handling system comprising:
    at least two processors;
    a memory operably coupled to the at least two processors;
    an operating system operably installed in the memory;
    a software program operably installed in the memory for making a device unavailable to the operating system while the operating system is running;
    a software program operably installed in the memory for making at least one of the at least two processors unavailable to the operating system while the operating system is running; and
    a software program operably installed in the memory for running a diagnostic test of the device, the at least one of the at least two processors executing the diagnostic test while the device and the at least one of the at least two processors are unavailable for use by the running operating system to determine whether the device is functioning acceptably.
12. The information handling system of claim 11, wherein
    the making the device unavailable includes ejecting the device; and
    the making the device available includes inserting the device.
13. The information handling system of claim 11, wherein
    the making the at least one of the at least two processors unavailable includes ejecting the processor; and
    the making the at least one of the at least two processors available includes inserting the processor.
14. The information handling system of claim 11, wherein
    the device is a logical object including at least one hardware component.
15. The information handling system of claim 11, wherein
    the at least one of the at least two processors is a logical object including at least one hardware component.
16. The information handling system of claim 11, further comprising:
    a software program operably installed in the memory for making the device available to the operating system if the diagnostic test demonstrates acceptable device functionality.
17. The information handling system of claim 16, wherein
    the running operating system receives requests for the making the device and the at least one of the at least two processors unavailable for use by the running operating system.

18. The information handling system of claim 11, wherein the software program operably installed in the memory for the making the device unavailable is a user-level application program;

the software program operably installed in the memory for making the at least one of the at least two processors unavailable is the user-level application program;

the software program operably installed in the memory for the running the diagnostic test is the user-level application program;

the software program operably installed in the memory for the making the device available is the user-level application program; and the software program operably installed in the memory for making the at least one of the at least two processors available is the user-level application program.

19. The information handling system of claim 11, wherein the running is interrupted when a workload increase of a predetermined magnitude occurs;

and the making the device available follows the interruption of the running.

20. The information handling system of claim 11, wherein the device is a memory component.

21. An apparatus comprising:

means for making a device unavailable for use by a running operating system;

means for making a processor unavailable for use by the running operating system; and means for running a diagnostic test of the device, the processor executing the diagnostic test to determine whether the device is functioning acceptably, while the processor and the device are unavailable for use by the running operating system.

22. The apparatus of claim 21, wherein the means for making the device unavailable includes means for ejecting the device; and the means for making the device available includes means for inserting the device.

23. The apparatus of claim 21, wherein the means for making the processor unavailable includes means for ejecting the processor; and the means for making the processor available includes means for inserting the processor.

24. The apparatus of claim 21, wherein the device is a logical object including at least one hardware component.

25. The apparatus of claim 21, wherein the processor is a logical object including at least one hardware component.

26. The apparatus of claim 21, further comprising:

means for making the device available for use by the running operating system if the diagnostic test demonstrates acceptable device functionality.

27. The apparatus of claim 26, wherein the running operating system receives requests for the making the device and the processor unavailable for use by the running operating system.

28. The apparatus of claim 21, wherein the means for the making the device unavailable is a user-level application program;

the means for making the processor unavailable is the user-level application program;

the means for the running the diagnostic test is the user-level application program;

the means for the making the device available is the user-level application program; and the means for the making the processor available is the user-level application program.

29. The apparatus of claim 21, wherein the running is interrupted and the making the device available follows the interruption of the running when a workload increase of a predetermined magnitude occurs.

30. The apparatus of claim 21, wherein the device is a memory component.

* * * * *